Nov. 23, 1954 K. S. DUNLAP 2,695,334
DIALING OR SIGNALING SYSTEM
Filed May 27, 1952 4 Sheets-Sheet 1

INVENTOR
K. S. DUNLAP
BY
William F. Simpson.
ATTORNEY

Nov. 23, 1954 K. S. DUNLAP 2,695,334
DIALING OR SIGNALING SYSTEM
Filed May 27, 1952 4 Sheets-Sheet 2
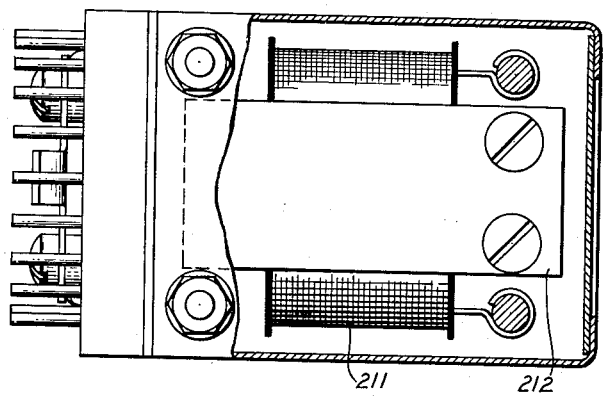
FIG. 5
FIG. 7
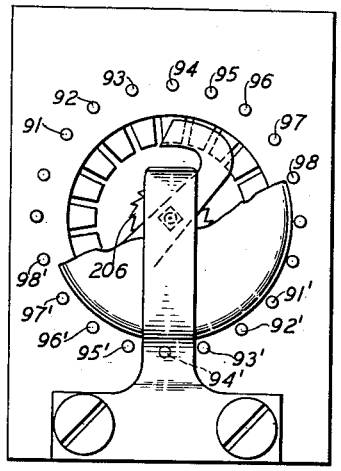
FIG. 6
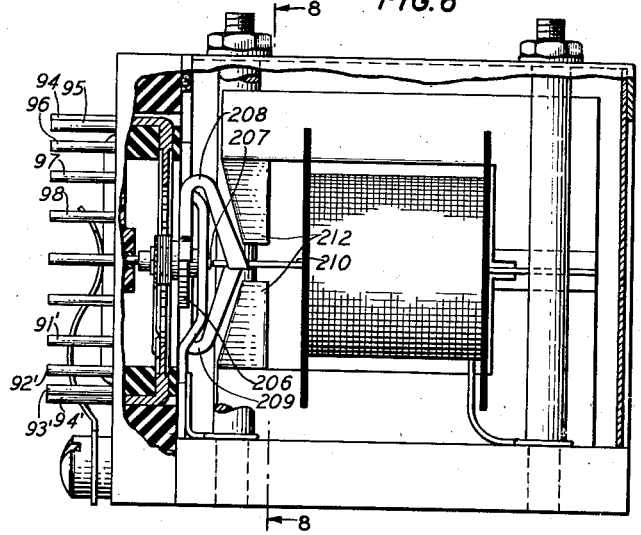
FIG. 8
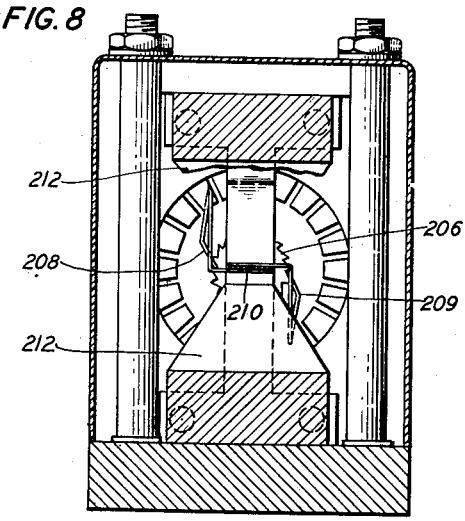
FIG. 9
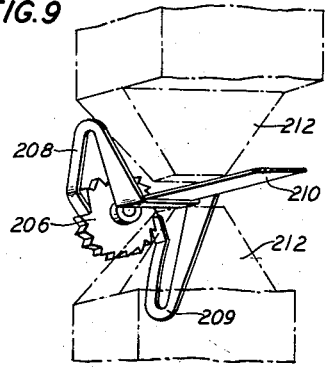
INVENTOR
K. S. DUNLAP
BY
William F. Simpson.
ATTORNEY INVENTOR
K. S. DUNLAP
BY
William F. Simpson
ATTORNEY Nov. 23, 1954     K. S. DUNLAP     2,695,334
DIALING OR SIGNALING SYSTEM
Filed May 27, 1952                  4 Sheets-Sheet 4

PULSE POSITIONS AS A FUNCTION OF TIME

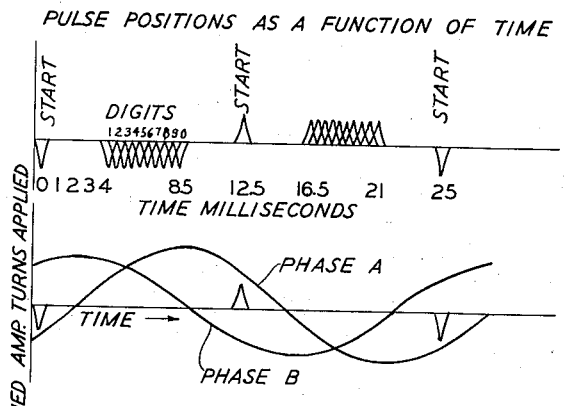

FIG. 11

FIG. 11A
GENERATION OF
START PULSES

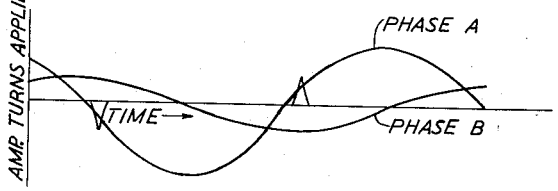

FIG. 11B
GENERATION OF PULSES
REPRESENTING DIGIT 1

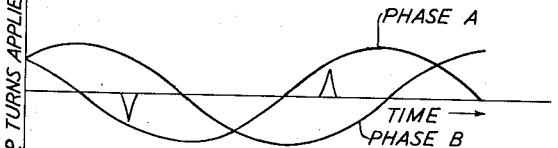

FIG. 11C
GENERATION OF PULSES
REPRESENTING DIGIT 5

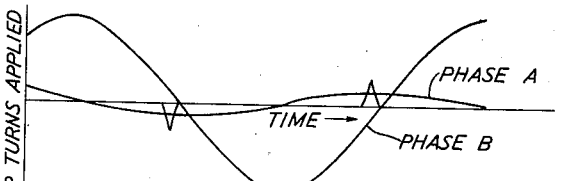

FIG. 11D
GENERATION OF PULSES
REPRESENTING DIGIT 10

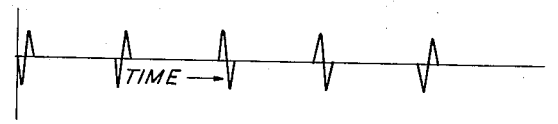

FIG. 11E
THE START PULSES AND
PULSES REPRESENTING THE
DIGIT 5 AS APPLIED TO THE
LINE DURING ONE CYCLE OF
THE EXCITATION PERIOD.

INVENTOR
K. S. DUNLAP
BY
William F. Simpson.
ATTORNEY

2,695,334

DIALING OR SIGNALING SYSTEM

Kermit S. Dunlap, Madison, N. J., assignor to Bell Telephone Laboratories, Incorporated, New York, N. Y., a corporation of New York Application May 27, 1952, Serial No. 290,290

5 Claims. (Cl. 179—16)

This invention relates to improvements in call signaling apparatus, circuits and methods and more particularly to improvements in telephone call signaling apparatus, circuits and methods and systems disclosed in United States Patent 2,594,300 granted to K. S. Dunlap and C. A. Lovell, April 29, 1952, which in turn related to improvements in calling circuits, apparatus and methods disclosed in Patent 2,499,606, granted March 7, 1950 to D. B. Parkinson.

An object of the present invention is to simplify and reduce the equipment necessary at the subscriber's station for generating electrical signaling current pulses of a type suitable for use in systems set forth in the above-identified patent and application.

Another object of this invention is to reduce the interfering currents and require less power for generating signaling pulses by generating only those pulses which are necessary to transmit signals over the subscriber's line.

Another object of this invention is to provide calling apparatus for generating signaling pulses by means of impulse coils having saturable cores of the type disclosed in the above-identified patent application and patent and wherein the secondary or output winding on each of these coils has been dispensed with.

Another object of this invention is to provide power supply circuits, equipment and apparatus at the central office suitable for supplying polyphase alternating current to the pulse generating equipment over subscribers' lines of varying lengths and types.

Another feature of this invention relates to summing pulses of different amplitudes received over the respective line conductors and combining them into an output pulse suitable for operating switching equipment of the type referred to in the above-identified patent application and patent.

In accordance with the present invention, call generating apparatus of the type disclosed in the above-identified patents is employed and generates two pulses to represent the identity or magnitude of each digit of a call subscriber's station identification or number. The time elapsing between the first or start pulse and the second or stop pulse represents the identity or magnitude of the respective digits.

A feature of this invention relates to pulse generating equipment employing a saturable core pulse generating coil for generating start pulses and another saturable core coil for generating the stop pulse. Each of these coils is provided with two primary or input windings and the windings of the stop pulse coil are provided with a plurality of taps for controlling the shape and time of generation of the stop pulse. Neither of these coils is provided with a secondary or output winding. Instead, the primary winding is used both for inducing or controlling the flux within the core and also for conveying the generated pulse back over the subscriber's line to the central office when the flux through the respective cores passes through zero in the manner set forth hereinafter.

Equipment is also provided at the central office for supplying two-phase alternating currents over the subscriber's line, one phase being connected between one line conductor and ground and the other phase being connected between the other line conductor and ground.

Each of these phases of the alternating current for operating the pulse generating equipment at the subscriber's station is supplied from a high impedance source at the central station such as a suitable power amplifier provided with series feedback connections so that the current output from the amplifier is substantially constant and independent of the resistance, reactance or impedance of the subscriber's line. The effective output impedance of such an amplifier is appreciably greater than the impedance of any of the lines encountered in the usual telephone systems. Consequently, variations in the resistance of the various subscribers' lines, to which this amplifier may be connected to supply current for operating the subscriber's equipment as set forth herein, is ineffective to appreciably alter or change either the magnitude or the phase of the currents transmitted over the lines to the subscriber's station.

Sources of power, such as this amplifier, are frequently called "constant current sources." Thus, these amplifiers operate as constant current sources of alternating current and are so described hereinafter.

When such amplifiers are employed to supply current to impulse generating coils of the type described herein the voltage output from these amplifiers rises abruptly to a relatively high voltage each time the flux through any one of the impedance coils passes through zero. It is thus possible to connect the receiving amplifier to the subscribers' lines in addition to the power transmitting amplifier and receive the impulses transmitted from the subscriber's station.

Inasmuch as no output winding is provided on the pulse generating coils so that the primary winding is employed for conveying the pulses to the central office and since the turns connected in the different windings of the coils varies between pulses representing different magnitudes, it is desirable to receive the pulses from both conductors and combine them. A summing amplifier and related circuit and apparatus are accordingly provided at the central office and connected to the two conductors of the subscriber's line and the output of this amplifier is employed to control the switching equipment at the central office.

Suitable selective switches and distributor means are also provided at the subscriber's station to enable the identity or the magnitude of the digits of the subscriber's number to be selected at will by the calling subscriber. The distributor arrangement is arranged to be driven or actuated by the alternating current supplied over the subscriber's line and it is arranged to advance one step or position for each pair of signaling pulses generated. In the specific embodiment set forth herein the distributor arrangement advances one step or position for each half cycle of alternating current supplied from the central office or central switching point and the pulse generating coils generate two pulses, that is, a start pulse and a stop pulse for each half cycle of the alternating current transmitted from the central office.

Each series of pulses representing a complete calling subscriber's station designation is separated by time intervals equivalent to the interval allotted to pulses representing two digits. During these intervals between series of pulses representing a complete subscriber's station designation the distributor is arranged to step but prevents transmission of any signaling pulses over the line at this time.

The foregoing and other objects and features of the invention may be more readily understood from the following description when read with reference to the accompanying drawing in which:

Fig. 5 is a top view, partially broken away, of the stepping mechanism;

Fig. 6 is a side view, partially broken away, of the stepping mechanism;

Fig. 7 is a front view, partially broken away, of the stepping mechanism;

Fig. 8 shows a section, partially broken away, taken along section line 8—8 of Fig. 6;

Fig. 9 is a partial disclosure of the stepping mechanism showing the pole-pieces, the armature and stepping pawls, and the ratchet wheel;

Figure 1:
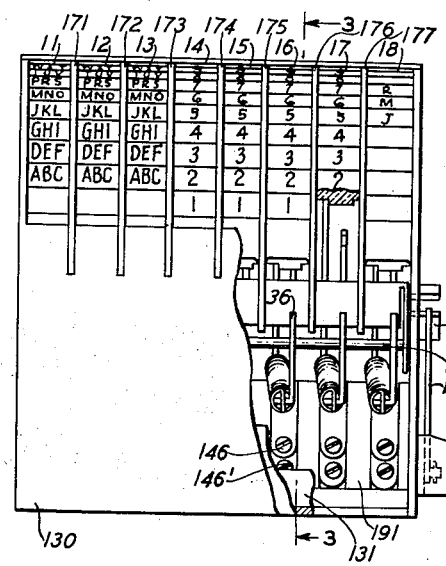
Fig. 1 is a front view partly broken away of the signaling or dialing apparatus.
Figure 2:
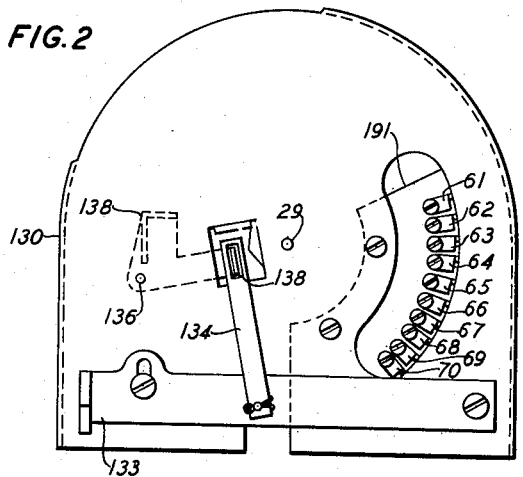
Fig. 2 is a side view of the same apparatus.

Fig. 11 indicates the possible or assignable pulse positions as a function of time;

Fig. 11A indicates the ampere-turns in the primary winding of the transformer for generating the start pulses during one cycle of the excitation current;

Fig. 11B indicates the ampere-turns in each of the primary windings of the transformer for generating the pulses representing the digit 1 during one cycle of the excitation current;

Fig. 11C indicates the ampere-turns in each of the primary windings of the transformer for generating the pulses representing the digit 5 during one cycle of the excitation current;

Fig. 11D indicates the ampere-turns in each of the primary windings of the transformer for generating the pulses representing the digit 0 during one cycle of the excitation current; and Fig. 11E indicates the start pulses and the stop pulses representing the digit 5, as generated during one cycle of the excitation current.

The manner in which the apparatus disclosed in this application may be incorporated in a complete telephone system is disclosed in copending application Serial No. 35,925 of W. A. Malthaner filed June 29, 1948. Suitable types of equipment for responding to the signaling pulses transmitted from the apparatus disclosed herein is disclosed in the copending applications of H. E. Vaughan, Serial No. 35,911, filed June 29, 1948; and W. A. Malthaner, N. D. Newby, and H. E. Vaughan, Serial No. 35,924, filed June 29, 1948. A similar signaling device is disclosed in copending application Serial No. 35,930 of D. B. Parkinson filed June 29, 1948. Novel features disclosed but not claimed herein are claimed in one or another of the above-identified applications.

In the exemplary embodiment shown herein, provision is made for the generation of pulse representations of eight characters during each cycle of operation, and these pulses are repeatedly generated as long as the excitation current is applied. Any arbitrarily chosen number of representations of characters (within reasonable limits) may be generated by properly designed signaling apparatus. A maximum of eight representations of characters was selected for this disclosure since eight-character calling numbers are in common use in telephone systems. It will be understood that these characters may be digits or letters or a combination of the two as commonly used in designating telephone calls. Each of the digits 0 to 9 will be represented by a different combination of two pulses, the pulse combination representing the digit 2 will also represent the letters A, B and C; the pulse combination representing the digit 3 will also represent the letters D, E and F; and so on. Hereinafter each combination of eight characters will be referred to as each called number irrespective of whether the combination comprises digits or letters and digits.

Exemplarily, each of the pulses generated is of about 1 millisecond in duration. When pulses of this duration are transmitted over various types of voice frequency communication paths encountered in telephone systems, about 3½ milliseconds are required for the longest transients to die out sufficiently so that the succeeding pulse may be accurately recognized without interference from the transient caused by the previous pulse. In other words each transmitted pulse of approximately 1 millisecond duration is in effect lengthened by a decaying alternating current of approximately 3½ milliseconds duration. At the end of this 3½ milliseconds period or any time thereafter a second pulse may be transmitted.

The signaling system employed in this embodiment of the invention comprises a start pulse of 1 millisecond duration for each character, the start pulses being generated at 12½ milliseconds interval as long as the pulsing transformers are energized, and a stop pulse of 1 millisecond duration for each character, each stop pulse reaching its peak value during the 4 to 8½ milliseconds interval of time after the start pulse has reached its peak value. In order to provide sufficient margins of safety to permit reliable signaling, 4 milliseconds are allowed for the decay of each pulse and the times of the start of transmission assigned to stop pulses representing digits of successive magnitudes differ by ½ millisecond. Thus, digit 1 is represented by a start pulse followed by a stop pulse which reaches its peak value 4 milliseconds after the start pulse reaches its peak value, digit 2 is represented by a start pulse followed by a stop pulse which reaches its peak value 4½ milliseconds after the start pulse reaches its peak value, and so on. It will be observed that the stop pulse for the digit 0 reaches its peak value 8½ milliseconds after its start pulse and 4 milliseconds before the next succeeding start pulse. Thus, there is required an increment of time of 4 milliseconds for the decay of the start pulse, 9 increments of time of ½ millisecond each for the generation of a pulse at any one of the ten times necessary to represent the various digits, and a last increment of time of 4 milliseconds, all of the latter being required to permit a stop pulse to decay only if it should occur at the end of the ninth increment of time. Consequently, 12½ milliseconds of time elapse between the start pulses of succeeding digits, from which it follows that 12½ milliseconds is required in this exemplary system to transmit each character designating the called number.

In order to indicate the starting point of the transmission of a called number, a time interval of approximately 25 milliseconds during which no pulses are transmitted is provided at the beginning of each pulse representation of a called number. Thus, a time interval of 125 milliseconds is required to transmit each eight-digit called number and the accompanying no-signal period. The foregoing exemplary times are based upon a supply frequency of 40 cycles per second. This invention is not limited to these times or to this driving frequency. Driving frequencies as high as 55 or 60 cycles per second have been used without materially changing the circuits. However, where desired higher or lower frequencies may be used by making minor changes in the circuit constants in well understood manners.

In accordance with this exemplary embodiment of the invention the signaling pulses are generated by saturation type pulse generating transformers. There are two transformers, one for the digit pulse representing the digits 0 to 9 and one for the start or reference pulse. The excitation current for the apparatus of the exemplary embodiment set forth herein is sinusoidal in form and is usually transmitted from a power source usually located at the central office over the line which interconnects the signaling station with the central office. This current is an alternating current of sinusoidal wave form and in the exemplary embodiment set forth herein one phase is transmitted between one line conductor and ground and another phase of this alternating current is transmitted to the subscriber's station over another conductor and ground.

Of course, the exciting current may be supplied locally at the subscriber's station when so desired or required or from some other point to which the subscriber's line extends.

Each of the pulse generating transformers has two input windings. The input windings of the transformers are interconnected and connected with the two phases of the excitation current so that one phase of the excitation current is applied to one input winding of each transformer and so that the other phase of the excitation current is applied to the other input winding of each transformer. The output pulses are also generated within these windings and in the exemplary embodiment of this invention set forth herein are transmitted over both of the line conductors to the central office.

The magnetic core of each transformer is designed to be saturated except for very small values of ampere-turns, and an electric pulse is generated by each transformer when the flux is changed from saturation of one polarity to saturation of the other polarity. The flux induced in the core of each transformer depends upon the number of turns in the two primary windings of the transformer and upon the current flowing in each winding.

As shown in the drawing, both the start pulse coil 310 and the stop or digit pulse coil 301 are provided with two primary windings, one winding being connected to one of the phases of the supply current and the other winding to another phase of the polyphase supply current. In the drawing the primary windings on the start coil 301 are shown connected in series with the primary or input windings of the stop pulse coil 310.

The time of occurrence of both the start pulse and stop pulses relative to the respective phases of the current applied to these windings is determined by the number of ampere turns of current from the respective phases which interlink the respective cores as is explained hereinafter.

As shown in the drawing, the stop pulse coil is provided with a tapped winding connected to phase A from the conductor 126 of line 125 and a tapped winding connected to phase B from the conductor 127 of line 125. The taps of the windings are connected to ground over circuits described herein and thus to the source of alternating current and the particular taps to which ground is connected determines the number of ampere-turns applied to the core of the transformer 301 by currents of each phase and in this manner controls the time of occurrence of the induced pulse in its output circuit.

The manner in which the number of ampere-turns applied to the windings connected to phase A and to phase B of the stop pulse coil 301 controls the time of occurrence of the output pulse may be more readily understood by reference to Figs. 11, 11A, 11B, 11C, 11D, and 11E.

Fig. 11 shows the possible times of occurrence of the start pulses. Thus in the exemplary embodiment set forth herein there are ten different times during which a stop pulse may occur designating the identity of the digit or symbol of the called subscriber's station designation.

Fig. 11A shows the ampere-turns applied to the core of the start pulse coil 310 by both phases A and B. When the sum of these ampere-turns goes through zero a pulse is generated in the output winding which pulse is illustrated in Fig. 11. When the two phase currents have a phase displacement of 90 degrees as shown in the drawing the total number of ampere-turns applied to the core is equal to the $\sqrt{N_A^2+N_B^2}$ where $N_A$ is the number of ampere-turns applied by phase A and $N_B$ is the number of ampere-turns applied to the core by phase B.

Fig. 11B shows the ampere-turns applied to the core of coil 301 when it is desired to generate a pulse representing the digit 1. In this case the number of ampere-turns applied by phase A is greater and the number of ampere-turns applied by phase B is less with the result that the time of occurrence of the output pulse is appreciably delayed as shown in Fig. 11B. Figs. 11C and 11D show progressively a greater number of ampere-turns applied to the core of transformer 301 by phase B and a progressively lesser number of ampere-turns applied by phase A to represent the higher digits. As progressively more and more ampere-turns are included in the winding connected to phase B, and less and less ampere-turns are applied to the core by phase A the output pulse is progressively delayed in time thus giving rise to the generation of the various stop pulses.

By providing two tapped input windings for the stop pulse coil 301, it is possible to simultaneously vary the ampere turns applied from each of the phases of the polyphase source to the core of the pulse generating coil 301. It is desirable to have the same total maximum number of ampere-turns applied to the core of this coil for each of the pulses generated thereby. By arranging the taps on the stop pulse coil 301 so that the core is subjected to the same total maximum flux for each of the various digit stop pulses the wave form of the stop pulses is substantially the same. When a secondary winding is provided, as in the above-identified Patent 2,594,300, the amplitude of these pulses is the same for all of the stop pulses as well as the wave form. However, in the present embodiment if the total magnetization of the core is made constant, i. e., $\sqrt{N_A^2+N_B^2}$=constant for each of the different stop pulses, then the total number of active turns, that is, the sum of the active turns in both input windings will not be constant. As a result, the magnitude of the pulse generated in each of the windings varies with each of the different digits represented by the pulses and the sum of the two pulses will also vary in magnitude since the sum of the turns of the two windings will not be constant. Under these circumstances, it still may be desirable to maintain the wave shape of the pulses substantially the same by providing the same total maximum magnetization for the core during the generation of the various stop pulses and then employ limiting or other amplitude controlling means or it may be desirable to attempt to secure either constant amplitude or a compromise between a constant amplitude and a constant wave form or wave shape of the respective pulses. However, the relative amplitudes of the fluxes due to the different phases are adjusted as described above and shown in Fig. 11 to control the time at which the pulses are generated.

Figure 10:
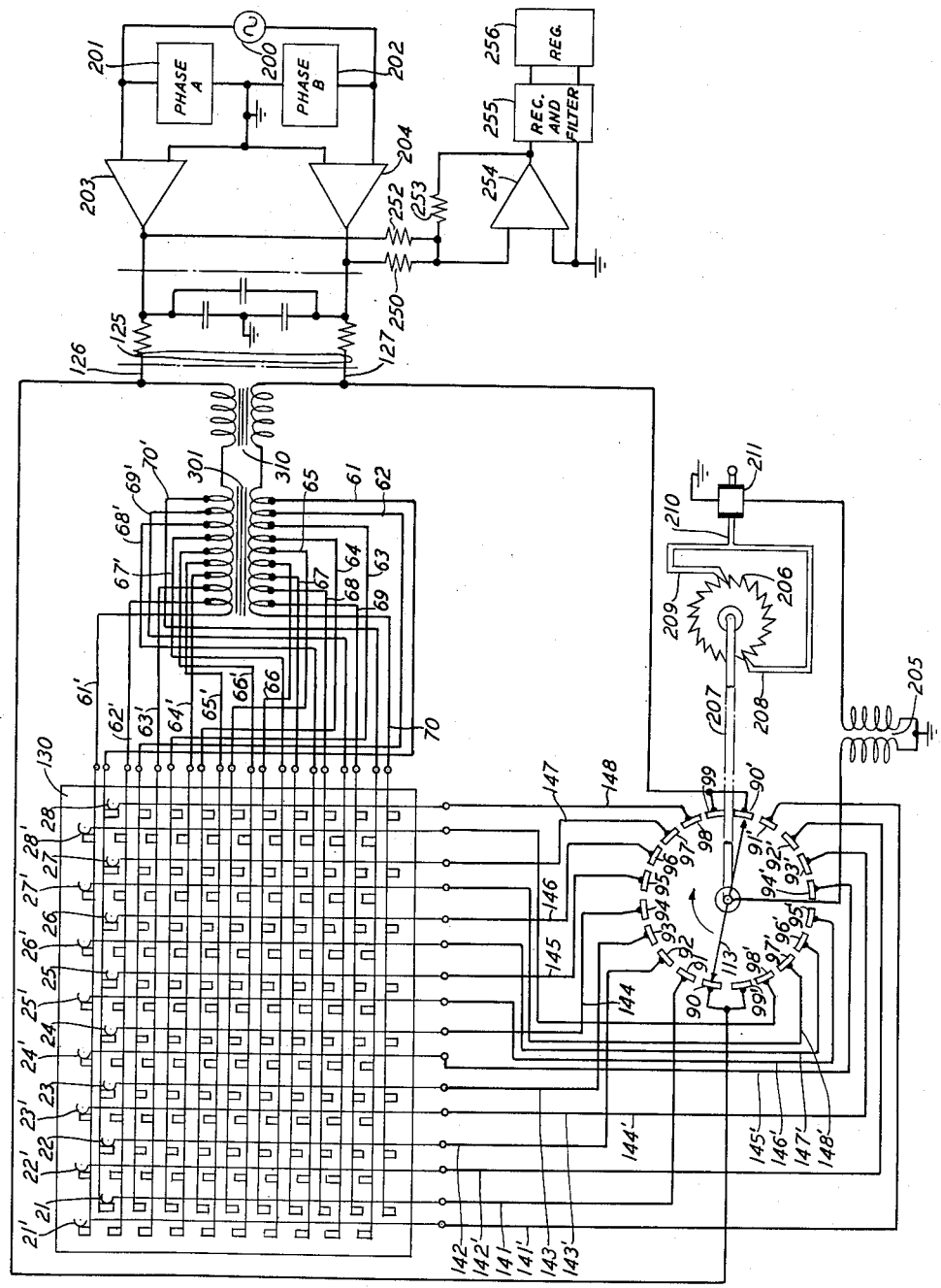
Fig. 10 shows the manner in which the dial, the stepping mechanism, the pulsing transformers, and other equipment are interconnected and cooperate one with another and with the telephone line and the circuits at the central office.

As shown in the exemplary embodiment of Fig. 10 the energizing current for the impulse coils 301 and 310 is supplied from source 200 located at the central office. This source is applied to the phase shifting devices 201 and 202 to secure two or more phases of alternating current having the same frequency as source 200. An output phase A is applied to amplifier 203 and then to conductor 126 extending to the subscriber's station where it passes through windings of the impulse coils 310 and 301. Likewise, phase B is applied to amplifier 204 and then transmitted over conductor 127 of line 125 to the subscriber's station and then applied to the lower windings of the impulse generation coils 310 and 301. The amplifiers 203 and 204 are arranged to operate as constant current sources of alternating current or power having the respective phases A and B. Suitable types of amplifiers are known and are usually provided with a series or current feedback in such a manner that the feedback is employed to maintain the output current of these amplifiers substantially constant. In other words, the output impedance of these amplifiers as viewed from the line conductors 126 and 127, respectively, may be made extremely high, i. e., of the order of one-half or one megohm. This impedance is much greater than the line impedance with the result that variations in the length or resistance of the subscribers' lines produces substantially no effect upon either the phase or the magnitude of the current flowing over the line conductors 126 and 127.

Suitable types of amplifiers are described in greater detail in Patent 2,102,671, granted to H. S. Black on December 21, 1937.

When the power for the impulses 310 and 301 is supplied from a pair of such amplifiers over a subscriber's line then when the flux in each of the cores goes through zero the impedance of the coils rises to a high value for a very short instant of time with the result that the voltage delivered from the amplifiers 203 and 204 rises to a corresponding high value in order to maintain substantially the same current flowing over the line conductors. As a result, this voltage which is in the form of a pulse of short duration may be employed to actuate the receiving devices at the central station. Such a device, in the exemplary embodiment of the invention set forth herein, comprises an amplifier 254 together with a summing network comprising resistors 250, 252 and 253. This summing amplifier in effect adds or sums the voltages from both of the line conductors and thus provides an output voltage which is a function of the sum of the two voltage pulses derived from the outputs of amplifiers 203 and 204 when the flux through the coils 301 and 310 passes through zero. Suitable types of summing amplifiers are described in Fig. 12 of Patent 2,408,081, granted to C. A. Lovell, D. B. Parkinson, K. D. Swartzel, Jr., and B. T. Weber on September 24, 1946. Such amplifiers are also discussed on page 99 of a book entitled "Vacuum Tube Amplifiers" by the Massachusetts Institute of Technology, Radiation Laboratory Series, volume 18, published by McGraw-Hill Book Company in 1948 and edited by Valley and Wallman. A similar arrangement is also described beginning on page 32 of a book entitled "Electronic Instruments" by the Massachusetts Institute of Technology, Radiation Laboratory Series, volume 21, published by McGraw-Hill Book Company in 1948 and edited by Greenwood, Holdam, and Macrae.

By use of the summing amplifier the output pulse is made more nearly of constant amplitude for the different pulses representing different digits independently of the magnitude of the pulses transmitted over the respective line conductors 126 and 127 of line 125. The output of the receiving amplifier 254 is in turn applied to a rectifier or detector and filter circuit 255 and then to register 256. The rectifier, the detector or the register, or any group of the devices may include pulse limiting and shaping network and apparatus.

Of course, it is to be understood that both the power supply circuits including source 200 and phase shifting networks 201 and 202 and amplifiers 203 and 204 as well as the receiving amplifier 254 and the summing resistors or networks including resistors 250, 252 and 253 are not usually permanently connected to any of the subscribers' lines. Instead, they are temporarily connected to these lines by means of switching apparatus during the time when pulses are transmitted from the subscriber's station to the central office to direct the establishment of a connection through the switching network. Since the switching apparatus operates in its usual manner it has not been shown or described herein.

It is thus evident that the pulses are applied to the receiving amplifier 254 each time the flux through the start pulse coil core 310 as well as through the stop pulse coil core 301 passes through zero. It is also evident that the flux through these cores may be made to pass through zero at the desired times in the manner described above and shown in Figs. 11 and 11A through 11E.

Fig. 11E shows the pulses transmitted over the line to the central station where they control switches as described hereinbefore for setting up communication paths.

Figure 3:
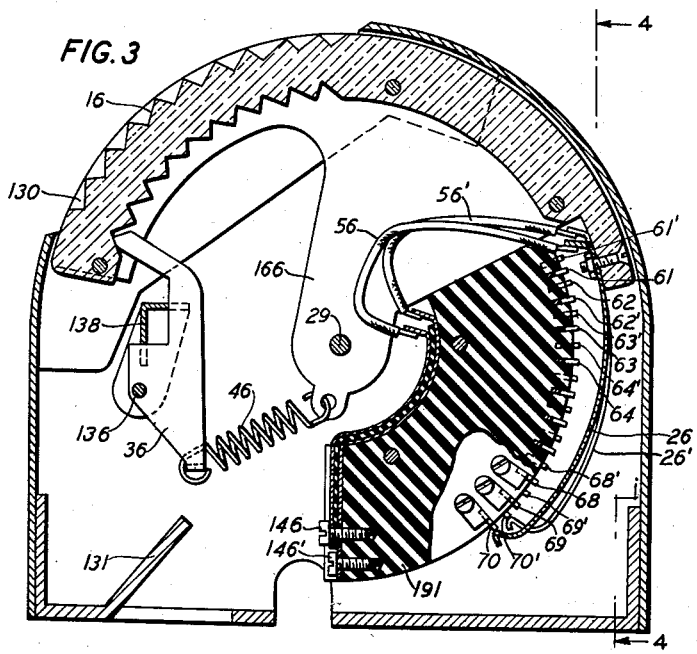
Fig. 3 shows a section taken along the section line 3 of Fig. 1.

Figs. 1, 2, 3 and 4 indicate one embodiment of the selector switch. It is enclosed in case 130, with selector dials 11 to 18 and release lever 133 accessible to an operator. The selector dials are made of a non-conducting material such as hard rubber or plastic, and each dial is provided with ten indentations along its outer periphery. Each indentation is designated by a letter or number conforming to the telephone signaling system, and each is of suitable configuration to permit an operator's finger to engage and move the dial. The selector dials are separated by spacers 171 to 177 which are attached to case 130. As indicated in Fig. 3, each dial is attached to an individual support 166 so that each dial may be moved approximately one-fourth of a revolution about shaft 29. The inner surface of each dial is provided with ten grooves which correspond to the finger indentations on the outer periphery of the dial. The grooves on each dial serve to engage with a detent pawl, to secure each dial in one of the ten possible positions as selected by the operator. As indicated in Fig. 3, the detent pawl 36 which corresponds to dial 16 is pivoted about shaft 136. Spring 46 is attached between support 166 and pawl 36 so that pawl 36 is normally forced against dial 16, thereby securing the dial in a fixed position by engaging with one of the ten grooves. Spring 46 also serves to apply a continuous force to support 166 which tends to rotate support 166 and dial 16 in a clockwise direction about shaft 29. The grooves on the dials and the detent pawls are shaped and positioned so that by pressing upon the finger indentations in a dial an operator can move the dial in either direction and so that the ratchet action of the pawl against the grooves secured the dial in any one of the ten positions to which it may be moved. The rotary movement of the dials is limited to about one-fourth of a revolution by stop 131 and insulator 191.

Release arm 138 is connected with release lever 133 through lever 134 and is provided with slots to engage each detent pawl. When lever 133 is in its normal position, arm 138 permits each detent pawl to engage with a groove in the corresponding dial. When lever 133 is depressed, arm 138 is moved in a clockwise direction about shaft 136 and the detent pawls are disengaged from the dials, thereby permitting the spring associated with each dial to cause each dial to return to its initial position.

Figure 4:
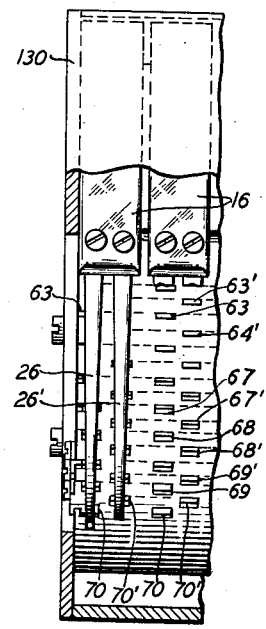
Fig. 4 is a rear view partly broken away along the line 4—4 of Fig. 3 to show the contact arrangement of the manual selector employed to select the identity or magnitudes of the respective digits of the calling number or station designation.

In order to provide for simultaneously changing taps on both of the windings of the stop pulse coil 301 two contact members are provided for each of the selector or dial members 11 through 18. These members are illustrated in Figs. 3 and 4 by springs 26 and 26' and are connected by means of flexible leads of wires 56 and 56' to the corresponding terminals of screws 146 and 146'. Each of the springs 26 are arranged to make contact with one of the bus bars 61 through 70 inclusive and each spring 26' is arranged to make contact with bus bars 61' through 70'. Thus in any position of the associated finger wheel or dial such as 16 of Fig. 3, brush or contact member 26 will make contact with one of the bus bars 61 through 70 and brush or contact member 26' will make contact with the corresponding bus bars 61' through 70'. The insulating member 191 extends along the rear of the selector mechanism and supports two sets of two bus bars 61 through 70 and 61' through 70' as indicated in the drawings. In this way contacts are made between the proper taps on the respective input windings of the stop pulse coil 301 and the distributor mechanism shown in Figs. 5, 6, 7, 8 and 9 and illustrated in Fig. 10 by the contact segments 91 to 98, inclusive and 91' through 98' inclusive.

Figs. 5, 6, 7, 8 and 9 indicate one embodiment of the stepping device and distributor. The distributor comprises two brushes 113 moving over a set of contacts. Contacts 91 to 98 and the eight contacts bonded by conductor 114 serve as distributor elements. The brushes are driven by ratchet wheel 206 through shaft 207. The ratchet wheel is driven by stepping pawls 208 and 209 which are attached to magnetic reed 210. The magnetic structure is polarized by permanent magnet 212 and magnetic reed 210 is actuated by coil 211. When an alternating current is applied to coil 211, the magnetic polarity of reed 210 is changed each half cycle of the alternating current so that the reed moves both upward and downward during each cycle of the alternating current. Each time reed 210 moves upward or downward ratchet wheel 206 is moved one step by one of the stepping pawls. Thus, ratchet wheel 206 and rotor 113 are moved one step during each half cycle of the alternating current.

In the embodiment of this invention shown in Fig. 10 the alternating current for operating and energizing the stepping device is supplied from the secondary winding of transformer 205 to the winding 211 of the stepping device. The primary winding of transformer 205 is connected to the brush arm 113. Consequently, the alternating current of both phases supplied over the subscriber's line flows through the primary winding of transformer 205 to ground. These phase currents are added together and produce a resultant alternating current having a phase different from either of them which alternating current is employed to actuate the stepping device. The stepping device is tuned and may in addition when desired include circuits and apparatus to properly phase the stepping of the device so that it steps during portions of the alternating-current cycle during which no pulses are generated.

During the time it is desired to suppress the transmission of pulses between each series of pulses representing a complete called subscriber's station designation, brush arm 113 is stepped first onto segments 99 and 99' and then into segments 90 and 90' as shown in the drawing. With brush arm 113 on these segments the primary winding of coil 205 is connected directly to both line conductors 126 and 127. As a result, no current flows through the windings of the impulse coils 310 and 301 with the result that no pulses are transmitted at this time.

As pointed out above, the stepping device is adjusted and regulated so that it steps during portions of the alternating-current cycle when no pulses are to be generated. In addition, the brush arm 113 is preferably of a bridging type so that switching transients caused by advancing this brush arm from one segment to the next are reduced to a minimum. Thus, by reducing these transients to a minimum and causing the brush arm to step at times when no pulses are to be generated these transients are reduced to a minimum so they do not interfere with the operation of the signaling system described herein.

In operating the calling device in accordance with this invention the subscriber will first position the dials or finger wheels 21 through 28, inclusive, in accordance with the digits, characters or symbols of the called subscriber's station designation or number. Actuation of these selecting devices will cause the members 21 through 28 and 21' through 28' to selectively make contact with the bus bars 61 through 70 and 61' through 70' and thus contact with the various taps of the input windings of the pulse coil 301. Thereafter the subscriber will initiate a call which in turn causes alternating-current power to be applied between both conductors to the subscriber's line 125 and ground, through transformer 201 and simplex coil 200, for example. The alternating current is then transmitted to the subscriber's station where it actuates the stepping magnet 211 and causes the brush arms 113 and 114 to rotate one step for each half cycle of alternating current. Likewise, during each half cycle of the alternating current, a start pulse is generated in the output winding of the start pulse coil 310 and a pulse is also generated at a later interval of time during the same half cycle in the output winding of the stop pulse coil 301.

Assuming that the distributor brush arms 113 and 114 start from the position shown and are rotated in a clockwise direction by the stepping magnet 211, during the first half cycle of the alternating current, arms 113 and 81 will complete a circuit from segments 91 and 91' to ground through the primary winding of transformer 205. The connection of segments 91 and 91' to ground through brush 113 connects ground to one of the taps of each of the tapped input windings of coil 301. The particular taps to which ground is connected are controlled by the setting of the contacts carried by the dial or finger wheel 21.

During each subsequent half cycle the succeeding segments 92 through 98 and 92' through 98' are successively connected to ground and each of these segments in turn connects ground to one of the taps of the stop pulse coil 301 in accordance with the setting of the corresponding dial or finger wheel, thus causing the transmission of stop pulses at varying time intervals after the transmission of the start pulse in accordance with the setting of the various dials or hand wheels at the calling subscriber's station.

After eight digits have been transmitted the brush arm 113 makes contact with segments 99, 99', 90, and 90', with the result that for two half cycles, that is, two steps of the stepping magnet 211, no pulses are transmitted, thus indicating that a complete called station designation has been transmitted. Thereafter the above cycle of operations is repeated and the various pulses repeated so long as the alternating-current power is connected to the line at the central office or some other distant station.

What is claimed is:

1. In a telephone system in combination, a subscriber's station, a central station, a telephone subscriber's line extending between said stations, a calling arrangement comprising a core of saturable material, a first tapped input winding linking said core connected to one conductor of said subscriber's line, a second tapped input winding also linking said core connected to a second conductor of said subscriber's line, a constant current source of alternating current of a given frequency and phase connected to one conductor of said subscriber's line, a source of alternating current of the same frequency but of different phase connected to another conductor of said subscriber's line, tap selecting mechanism for selecting pairs of taps one on each of said input windings for controlling the magnitude of the flux of each of said phases induced in said core and thereby controlling the time the total flux through said core passes through zero and generates pulses within said windings for transmission over said conductors to said central station.

2. In a telephone system in combination, a subscriber's station, a central station, a telephone subscriber's line extending between said stations, a calling arrangement comprising a core of saturable material, a first tapped input winding linking said core connected to one conductor of said subscriber's line, a second tapped input winding also linking said core connected to a second conductor of said subscriber's line, a constant current source of alternating current of a given frequency and phase connected to one conductor of said subscriber's line, a second constant current source of alternating current of the same frequency but of different phase connected to another conductor of said subscriber's line, tap selecting mechanism for selecting pairs of taps one on each of said input windings for controlling the time the flux through said core passes through zero and generates pulses within said windings for transmission over said conductors of said central station, receiving apparatus at said central station connected to a plurality of conductors of said subscriber's line, and means for summing the impulses received on each of said subscriber line conductors.

3. In a telephone signaling system in combination, a subscriber's station, a central station, a multiconductor subscriber's line extending between said stations, a constant current source of alternating current of predetermined frequency and phase connected to one of said conductors at said central station, a second constant current source of alternating current of the same frequency but different in phase connected to another conductor of said subscriber's line, impulse means connected to a plurality of conductors at said subscriber's station for generating signaling impulses and transmitting them over said subscriber's line, receiving equipment at said central station connected to a plurality of conductors of said subscriber's line, a summing amplifier included in said receiving device for combining the pulses received over each of the conductors of said subscriber's line.

4. In a telephone signaling system, a central station, a subscriber's station, a multiconductor subscriber's line extending between said subscriber's station and said central station, impulse generating equipment at said subscriber's station including a core of saturable material, a first tapped input winding linking said core and connected to one conductor of said subscriber's line, a second tapped input winding also linking said core and connected to another conductor of said subscriber's line, a constant current source of polyphase alternating current, said central station interconnections for connecting one phase of said polyphase alternating current to one of said subscribers' lines to one of said phases and for connecting another subscriber's line to another of said phases of said constant current polyphase source of alternating current, manual selecting apparatus at said subscriber's station for manually selecting a plurality of pairs of said taps, a distributor for successively interconnecting said selected pairs of taps in circuit with said line conductors, a receiving device at said central station including a summing amplifier, and means for interconnecting said summing amplifier with each of a plurality of conductors of said subscriber's line for receiving pulses transmitted thereover.

5. In a telephone signaling system, a signal receiver comprising in combination an electronic summing circuit, connections from said summing circuit to a plurality of input signaling paths, responsive apparatus connected to said summing circuit responsive to the sum of signals received over said plurality of input paths.

No references cited.